(12) United States Patent
Lin

(10) Patent No.: US 11,846,560 B2
(45) Date of Patent: Dec. 19, 2023

(54) AUTOMATIC LEVELING SYSTEM

(71) Applicant: TRIPLE WIN TECHNOLOGY(SHENZHEN) CO. LTD., Shenzhen (CN)

(72) Inventor: Yen-Sheng Lin, New Taipei (TW)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 786 days.

(21) Appl. No.: 17/002,087

(22) Filed: Aug. 25, 2020

(65) Prior Publication Data

US 2021/0389209 A1 Dec. 16, 2021

(30) Foreign Application Priority Data

Jun. 16, 2020 (CN) .......................... 202010550751.6

(51) Int. Cl.
*G01M 11/00* (2006.01)
*G01M 11/02* (2006.01)
*G01C 9/06* (2006.01)

(52) U.S. Cl.
CPC ............ *G01M 11/0214* (2013.01); *G01C 9/06* (2013.01); *G01M 11/0257* (2013.01); *G01C 2009/066* (2013.01); *G01M 11/0235* (2013.01)

(58) Field of Classification Search
USPC ...................................................... 356/139.1
See application file for complete search history.

(56) References Cited

U.S. PATENT DOCUMENTS

| | | | | |
|---|---|---|---|---|
| 5,610,711 A | * | 3/1997 | Rando .................. | G01C 15/002 33/290 |
| 9,329,026 B2 | * | 5/2016 | Altendorf ............ | G01B 11/005 |
| 10,299,880 B2 | * | 5/2019 | Ramirez Luna ..... | H04N 13/246 |
| 10,520,301 B1 | * | 12/2019 | Tobiason ............... | G06T 1/0014 |
| 11,448,498 B2 | * | 9/2022 | Chen ...................... | G01B 11/24 |
| 2015/0159998 A1 | * | 6/2015 | Altendorf ............ | G01B 11/026 356/635 |
| 2018/0303574 A1 | * | 10/2018 | Ramirez Luna ..... | H04N 13/225 |

(Continued)

FOREIGN PATENT DOCUMENTS

| | | | | |
|---|---|---|---|---|
| CN | 1474161 A | | 2/2004 | |
| CN | 102278943 A | * | 12/2011 | |
| CN | 104697455 A | * | 6/2015 | ........... G01B 11/005 |

(Continued)

*Primary Examiner* — James R Hulka
(74) *Attorney, Agent, or Firm* — ScienBiziP, P.C.

(57) ABSTRACT

An automatic leveling system includes a platform, a leveling device provided on the platform, a loading tray provided on the leveling device, three reflecting devices provided on the loading tray, an image acquisition device provided above the loading tray, a height positioning device provided on an end of the image acquisition device facing the loading tray, a light source configured to emit light, and a controller coupled to the image acquisition device. The height positioning device processes light emitted by the light source into three paths of light to the three reflecting devices. The three reflecting devices reflect the three paths of light. The image acquisition device acquires the three paths of reflected light into a light signal. The controller detects deflection values of the loading tray according to the light signal and controls the leveling device to level the loading tray.

12 Claims, 10 Drawing Sheets

(56) References Cited

U.S. PATENT DOCUMENTS

2021/0131795 A1* 5/2021 Chen ................. G01B 11/24

FOREIGN PATENT DOCUMENTS

| CN | 110044293 | A | * | 7/2019 | ............. | G01B 11/24 |
| CN | 110892305 | A | * | 3/2020 | ............. | A61B 90/20 |
| CN | 111256616 | A | * | 6/2020 | ............. | G01B 11/24 |
| CN | 111380470 | A | * | 7/2020 | ........... | G01B 11/005 |
| CN | 113075177 | A | * | 7/2021 | ........... | G01N 21/643 |

* cited by examiner

AUTOMATIC LEVELING SYSTEM

FIELD

The subject matter herein generally relates to an automatic leveling system for automatically leveling an instrument.

BACKGROUND

The existing lens testing machine usually includes a platform for placing the lens. Before testing the lens, the platform must first be leveled. However, the leveling process requires manual operation, which is inefficient and prone to error.

BRIEF DESCRIPTION OF THE DRAWINGS

Implementations of the present disclosure will now be described, by way of embodiments, with reference to the attached figures.

DETAILED DESCRIPTION

Figure 1:
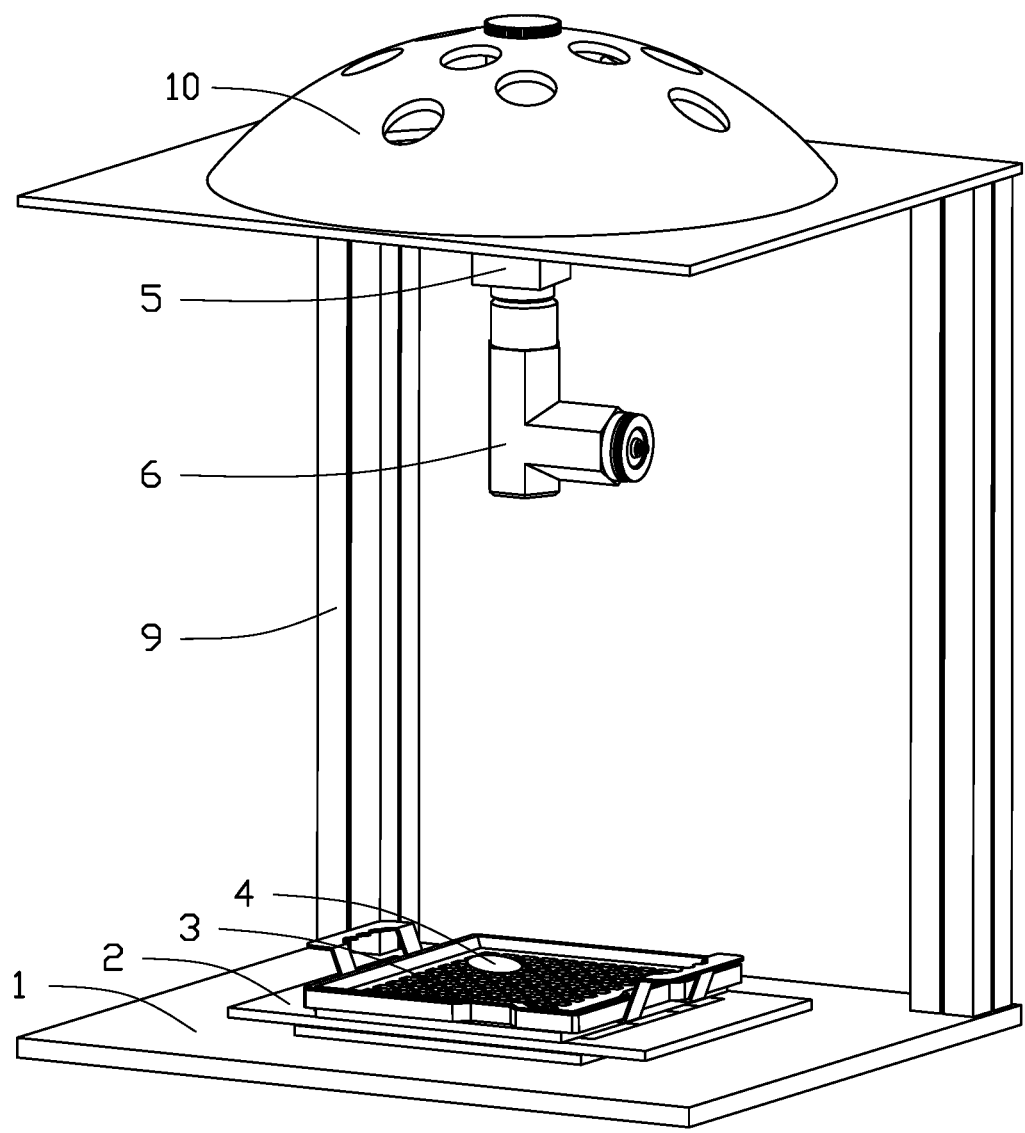
FIG. 1 is a schematic structural diagram of an automatic leveling system according to an embodiment.
Figure 2:
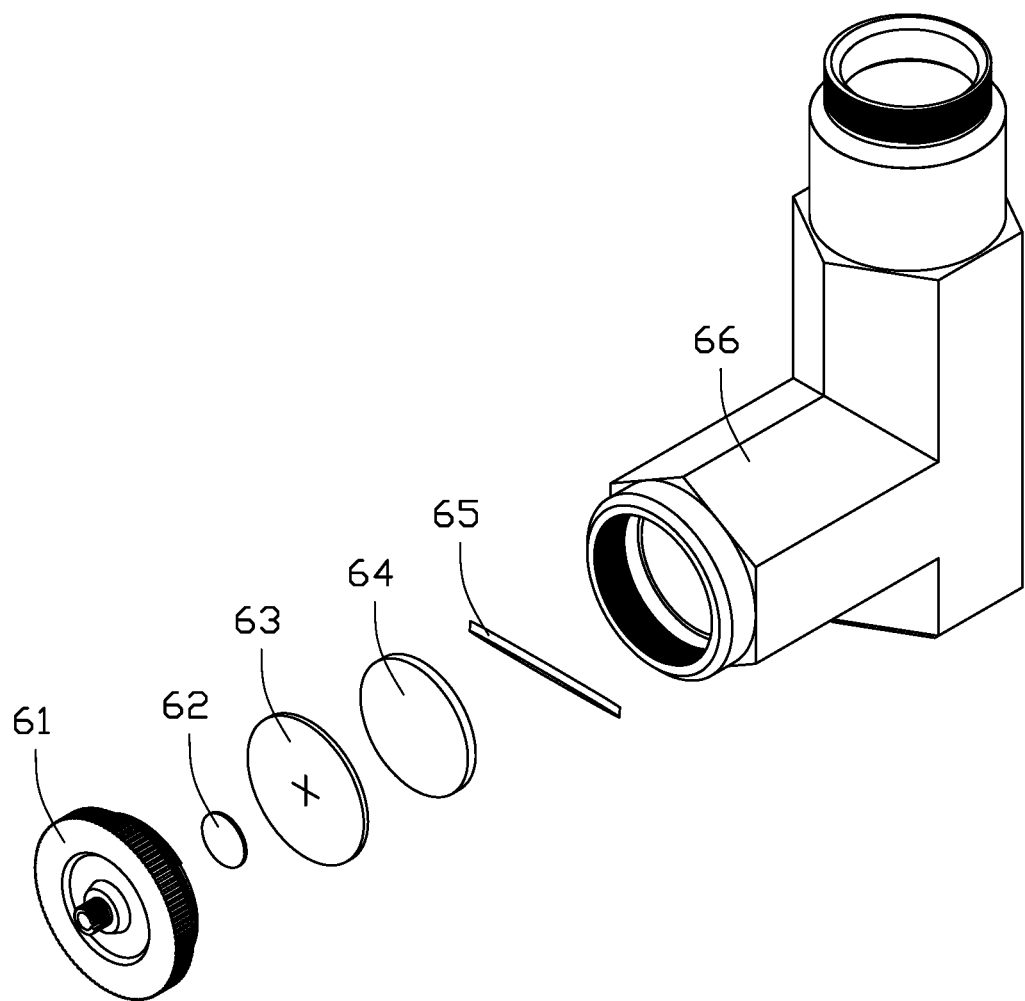
FIG. 2 is an exploded view of a height positioning device of the automatic leveling system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Referring to FIGS. 1-8, an automatic leveling system 1000 includes a platform 1, a leveling device 2 provided on the platform 1, a loading tray 3 provided on the leveling device 2, at least three reflecting devices 4 provided on the loading tray 3, an image acquisition device 5 located above the loading tray 3, a height positioning device 6 provided on an end of the image acquisition device 5 adjacent to the loading tray 3, a light source 7 cooperating with the height positioning device 6, and a controller 8 connected to the image acquisition device 5.

Figure 8:
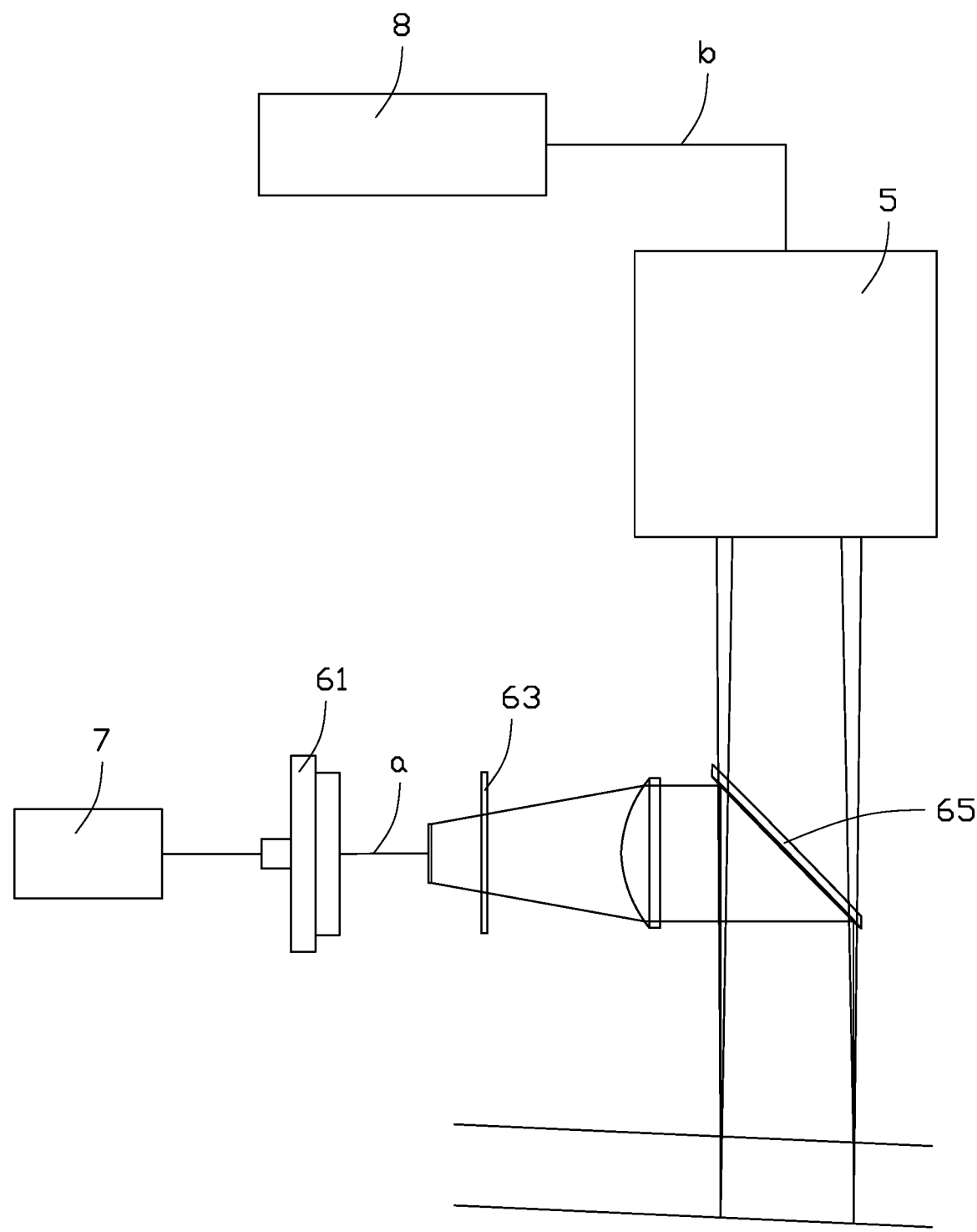
FIG. 8 is a light path diagram of the automatic leveling system based on FIG. 7.

As shown in FIG. 8, the light source 7 is located at an input end of the height positioning device 6. The light source 7 emits light a to the height positioning device 6. The height positioning device 6 processes the light a into at least three paths of the light a, and the at least three paths of the light a are incident on all of the reflecting devices 4 at the same time. The reflecting devices 4 reflect the at least three paths of the light ray a. The image acquisition device 5 collects the reflected light a to form a light signal b. The controller 8 acquires the light signal b, determines a deflection value of the loading tray 3 according to the light signal b, and controls the leveling device 2 to adjust the loading tray 3 according to the deflection value so that the loading tray 3 is parallel to a horizontal plane. At least three reflecting devices 4 are provided, and the at least three reflecting devices 4 are located at different positions of the loading tray 3 not on the same straight line, so that the image acquisition device 5 can capture images at three different positions of the loading tray 3. The three different positions constitute a plane, and the deflection value of the loading tray 3 can be determined through the images at the three different positions. The automatic leveling system 1000 can quickly and accurately perform automatic leveling functions with high accuracy and high speed, which effectively improves correction efficiency and correction accuracy.

The automatic leveling system 1000 can also be applied to other instruments that need to be leveled, and can also be used with a calculator system to measure the deflection value of the platform 1.

As shown in FIG. 1, in one embodiment, a support arm 9 is provided on the platform 1, a support plate 10 is provided on the support arm 9, and the image acquisition device 5, the height positioning device 6, and the light source 7 are arranged below the support plate 10. The support plate 10 is recessed in a direction away the platform 1 to form a receiving space. The image acquisition device 5, the height positioning device 6, and the light source 7 are received in the receiving space, and the support plate 10 can protect internal components received therein.

Figure 4:
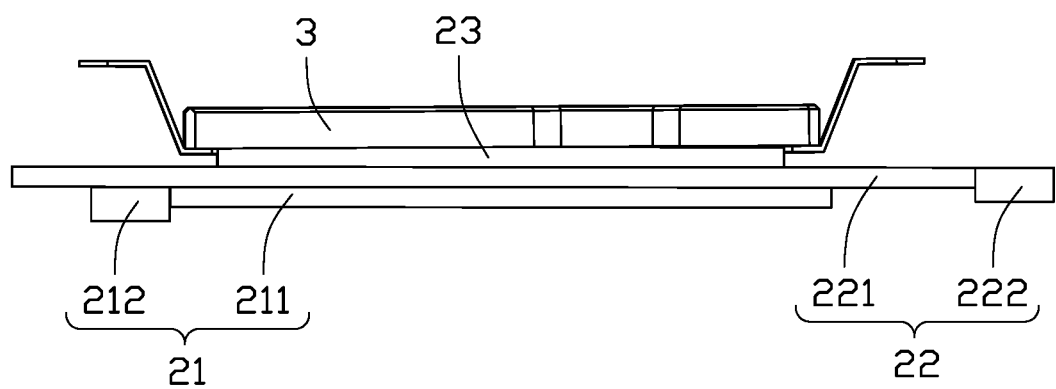
FIG. 4 is a structural diagram of a leveling device of the automatic leveling system.
Figure 5:
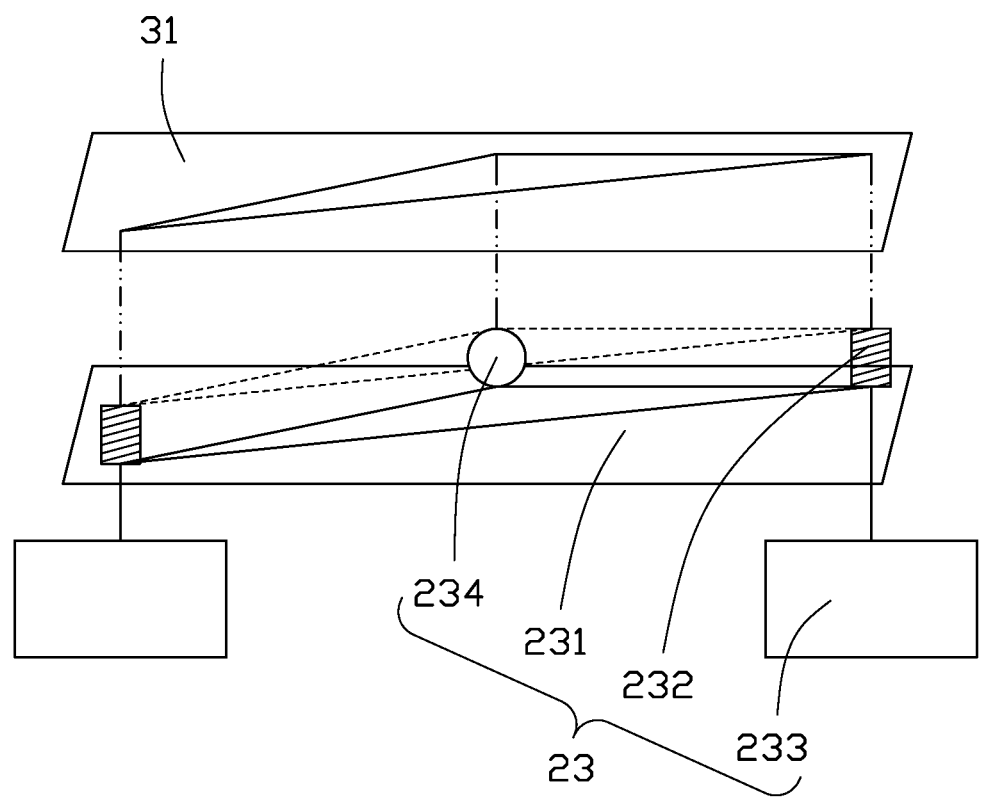
FIG. 5 is a structural diagram of a third adjustment mechanism of the automatic leveling system according to a first embodiment.

As shown in FIGS. 1, 4, and 5, in one embodiment, the leveling device 2 is provided on an upper surface of the platform 1 and located directly below the height positioning device 6 for light transmission and level correction. The leveling device 2 includes a first adjustment mechanism 21 provided on the platform 1, a second adjustment mechanism 22 provided on the first adjustment mechanism, and a third adjustment mechanism 23 provided on the second adjustment mechanism 22. The loading tray 3 is provided on the third adjustment mechanism 23. The first adjustment mechanism 21 can drive the loading tray 3 to move in a first direction, the second adjustment mechanism 22 can drive the loading tray 3 to move in a second direction, and the third adjustment mechanism 23 can drive the loading tray 3 to move in a third direction. The third direction is perpendicular to a plane formed by the first direction and the second direction. A three-axis coordinate system is established in the first direction, the second direction, and the third direction. The three directions are respectively an X, Y, and Z axis. The X and Y axes are parallel to the plane of the platform 1. The controller 8 processes the light signal b to obtain an X-axis deflection value, a Y-axis deflection value, and a Z-axis deflection value of the loading tray 3, and controls the leveling device 2 to perform adjustment in the X-axis direction, the Y-axis direction, and the Z-axis direction so as to realize automatic leveling of the loading tray 3. The three-axis automatic adjustment of the leveling device 2 controlled by the controller 8 can achieve the purpose of automatically calibrating and leveling the loading tray 3, and the entire adjustment process is automatically realized, with high adjustment accuracy and fast adjustment speed.

In one embodiment, the first adjustment mechanism 21 includes a first carrying platform 211 provided on the platform 1 and a first driving motor 212 provided on the first carrying platform 211. The first driving motor 212 is connected to the controller 8, and the controller 8 is configured to drive the first carrying platform 211 to move in the first direction through the first driving motor 212. The second adjustment mechanism 22 includes a second carrying platform 221 arranged on the first carrying platform 211 and a second driving motor 222 arranged on the second carrying platform 221. The second driving motor 222 is connected to the controller 8, and the controller 8 is configured to drive the second carrying platform 221 to move in the second direction through the second driving motor 222.

The third adjustment mechanism 23 includes a third carrying platform 231 provided on the second carrying platform 221, at least two lifting units 232 provided on the third carrying platform 231, a third driving motor 233 for driving the at least two lifting units 232, and a universal adjustment unit 234. The third carrying platform 231 is provided with lifting holes 236 corresponding to the lifting units 232, and the lifting units 232 can be lifted up and down in the lifting holes 236. In one embodiment, the number of the lifting units 232 is two, and the two lifting units 232 and the universal adjustment unit 234 are located on the same plane and form a triangular structure. The loading tray 3 is arranged on the two lifting units 232 and the universal adjustment unit 234. The third driving motor 233 is connected to the controller 8, and the controller 8 controls the third driving motor 233 to drive the lifting units 232 to move in the third direction, and then cooperates with the universal adjustment unit 234 to adjust the height of the loading tray 3. In one embodiment, the number of the third driving motor 233 is two, and the two third driving motors 233 correspond to the lifting units 232 one-to-one. Each lifting unit 232 is independently driven by one third driving motor 233, so any one of the lifting units 232 can be adjusted separately to achieve the purpose of leveling.

In one embodiment, the two lifting units 232 are respectively located at two opposite corners of the third carrying platform 231, and the universal adjustment unit 234 is located on one side edge of the third carrying platform 231. The height of the universal adjustment unit 234 is fixed, but does not limit the movement of the loading tray 3. By adjusting the height of the two lifting units 232, the universal adjustment unit 234 cooperates to level the loading tray 3 accurately and quickly. The universal adjustment unit 234 ensures the stability of the loading tray 3 and reduces the number of lifting units 232, so that adjustment accuracy is ensured, adjustment time is saved, and the complexity of the mechanism is reduced.

In one embodiment, the lifting unit 232 is a screw, and the screw is driven up or down by the third driving motor 233 to achieve the purpose of adjusting the height of different positions of the loading tray 3, and the structure is simple. The adjustment height is easy to control, and it is convenient to improve the adjustment accuracy.

Figure 6:
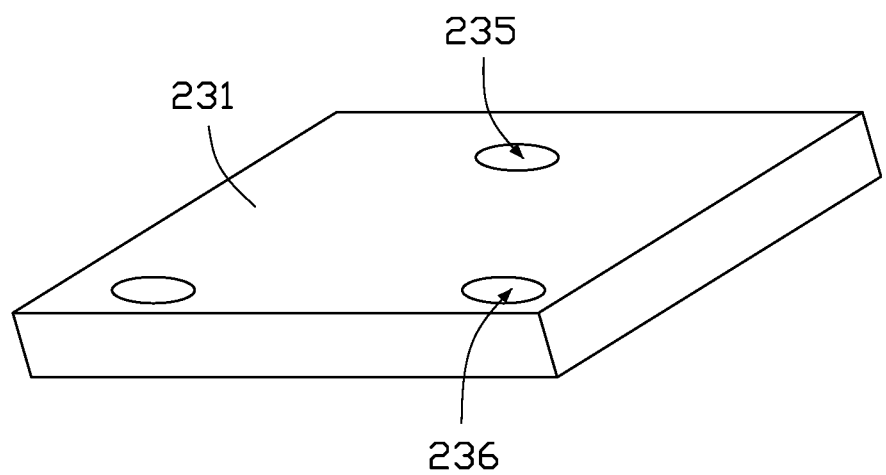
FIG. 6 is a structural diagram of a third carrying platform of the automatic leveling system.
Figure 7:
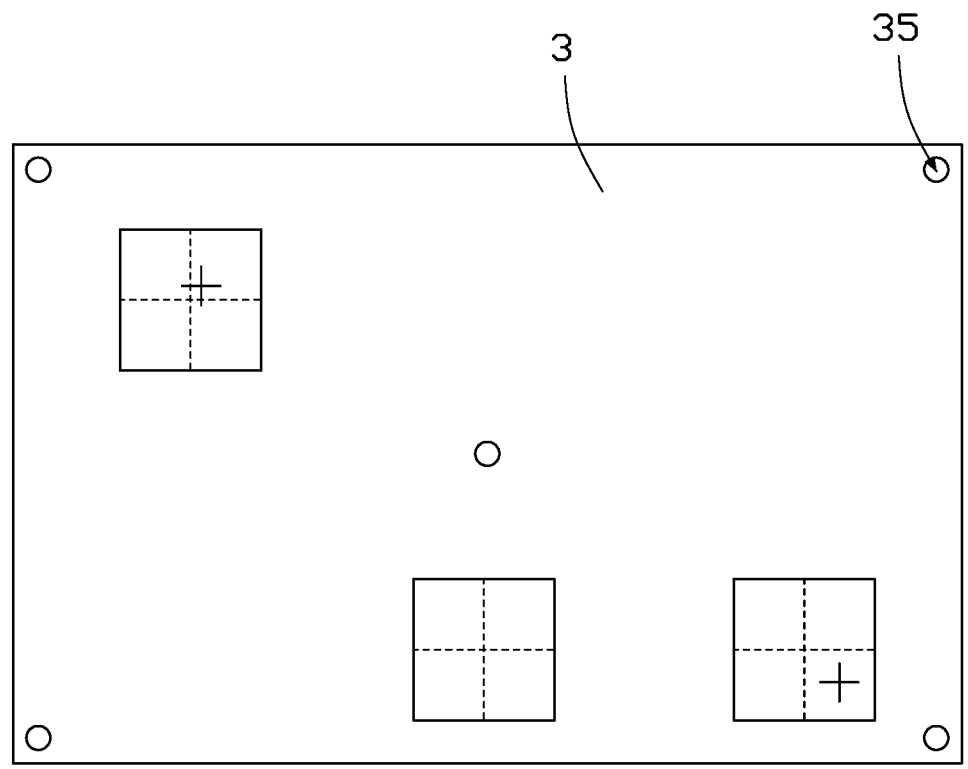
FIG. 7 is a diagram of a reflection position on the loading tray.

As shown in FIGS. 5 and 6, in one embodiment, the universal adjustment unit 234 is a round ball, and the third carrying platform 231 is provided with a first round groove 235 corresponding to the universal adjustment unit 234. The bottom of the loading tray 3 is provided with a tray plate 31, and the tray plate 31 is also provided with the first round groove 235 corresponding to the universal adjustment unit 234, so that the universal adjustment unit 234 is received in two opposite first round grooves 235 and configured to rotate in the two first round grooves 235 to cooperate with the two lifting units 232 and ensure flexibility and smoothness of the adjustment process.

Figure 3:
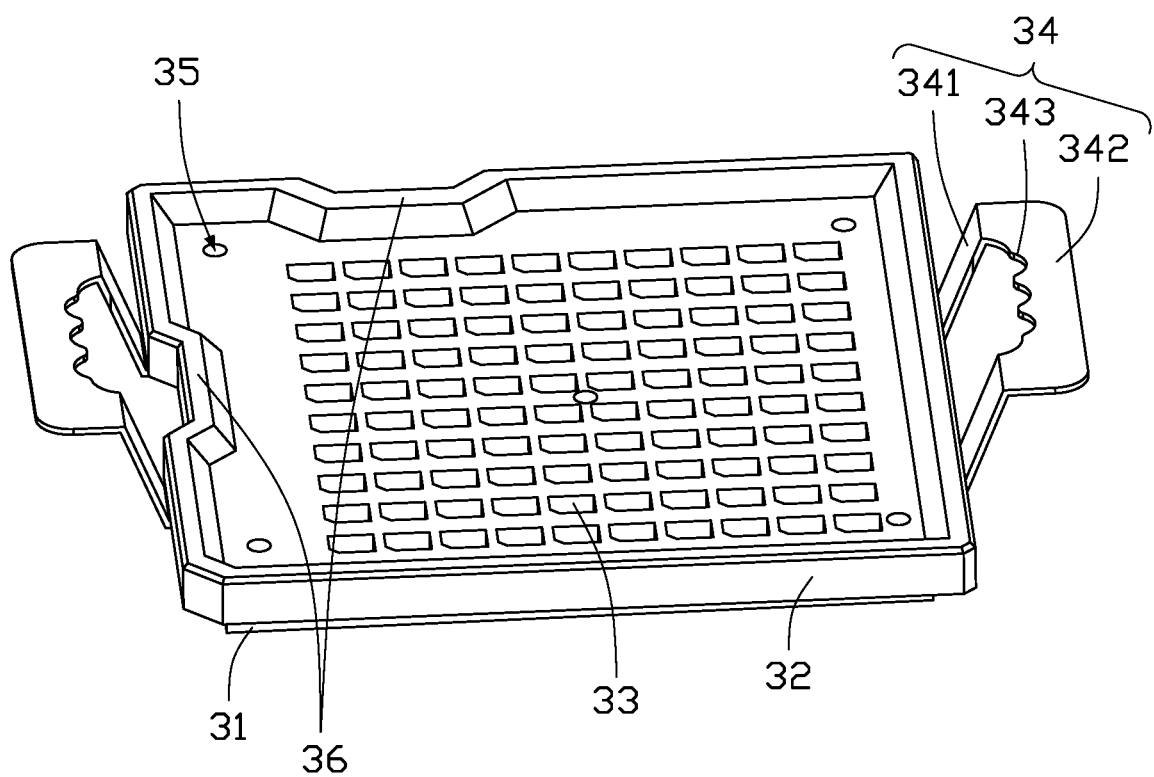
FIG. 3 is a structural diagram of a loading tray of the automatic leveling system.

As shown in FIG. 3, the loading tray 3 further includes a tray body 32 provided on the tray plate 31, a plurality of lens grooves 33 provided on an inner bottom surface of the tray body 32, two handles 34 respectively provided on two opposite side walls of the tray body 32, a plurality of positioning grooves 35 provided on the inner bottom surface of the tray body 32, and two foolproof structures 36 provided on the tray body 32. The reflecting device 4 is set in the positioning grooves 35. In one embodiment, the tray body 32 has a substantially rectangular structure and is made of metal, such as stainless steel. The lens groove 33 is a trough structure. The bottom of the lens groove 33 is provided with a magnetic device with a smooth surface. A lens to be tested is stably fixed in the lens groove 33 by the magnetic device so as to avoid errors caused by the uneven fixing of the lens in the lens groove 33. In one embodiment, the handle 34 is made of metal, such as stainless steel. The handle 34 includes two connecting arms 341 and a grip portion 342 connecting the two connecting arms 341. The two connecting arms 341 and the grip portion 342 form a U-shaped structure, and the two connecting arms 341 are fixed on the side wall of the tray body 32. The grip portion 342 defines a plurality of concave grooves 343 on an edge of the grip portion 342 facing the tray body 32 for improving the comfort of gripping. The handles 34 are connected to the tray body 32 at a 45° angle to improve the stability of picking and placing the loading tray 3. The two foolproof structures 36 are respectively arranged on two adjacent side walls of the tray body 32, so that when the loading tray 3 is picked and placed, the loading tray 3 is prevented from being placed in a wrong position.

The reflecting device 4 is an aluminum reflector, which has high reflectivity and a simple preparation process, and is not easy to be damaged, is easy to disassemble and assemble, and is low in price. At least three reflecting devices 4 are required, and the three reflecting devices 4 are located at different positions of the loading tray 3 and are not on the same straight line, so that the image acquisition device 5 can capture the images of the loading tray 3 at three different positions to constitute a plane, and the deflection values of the loading tray 3 can be determined through the images at the three different positions.

As shown in FIG. 1, the image acquisition device 5 collects the reflected light a passing through the height positioning device 6, converts the light a into the light signal b, and transmits the light signal b to the controller 8. In one embodiment, the image acquisition device 5 uses a CCD camera without additional components, which saves costs and reduces the complexity of the overall structure.

As shown in FIG. 1, FIG. 2, FIG. 7, and FIG. 8, the height positioning device 6 includes an optical fiber connector 61, a light homogenizer 62, a cross light transmissive sheet 63, a lens 64, and a half mirror 5 arranged in sequence along an emission direction of the light a. The half mirror 65 is located directly below the image acquisition device 5, and the light source 7 is located on a side of the optical fiber connector 61 away from the light homogenizer 62. In one embodiment, the optical fiber connector 61, the light homogenizer 62, the cross light transmissive sheet 63, the lens 64, and the half mirror 65 are arranged in a horizontal direction in sequence, and the half mirror 65 is inclined at a substantially 45° angle relative to a horizontal plane, which can ensure that the light a emitted by the light source 7 is reflected by the half mirror 65 to the reflecting devices 4 and the light a reflected by the reflecting devices 4 enters the image acquisition device 5 through the half mirror 65.

The propagation path of the light a is described as follows. The light source 7 emits the light a. The light a enters the cross light transmissive sheet 63 through the optical fiber connector 61 and the light homogenizer 62. After the cross light transmissive sheet 63 processes the light a into a cross light, the cross light is focused by the lens 64 onto the half mirror 65. The half mirror 65 reflects the cross light onto the upper surface of all of the reflecting devices 4 at the same time, and multiple paths of the light a are reflected by all of the reflecting devices 4 at the same time. The multiple paths of the reflected light a enter the half mirror 65 and are reflected by the half mirror 65 into the image acquisition device 5. As shown in FIG. 8, three paths of the light a are reflected by the three reflecting devices 4, respectively, and the three paths of the light a are acquired by the image acquisition device 5 after reflection. Thus, an image acquisition process of multiple points on the loading tray 3 can be completed at one time, which improves the correction efficiency.

In one embodiment, the height positioning device 6 is installed at a lower end of the image acquisition device 5, and only a CCD camera needs to be used. By removing a lens originally provided with the CCD camera, the height positioning device 6 can be directly connected to the CCD camera at a position of the original lens of the CCD camera. A connection structure of the height positioning device 6 is designed to match the original lens design, so that the height positioning device 6 is easy to install. This method reduces the number of CCD cameras used, and at the same time reduces the complexity of the overall structure and the difficulty of disassembly and assembly.

In one embodiment, the height positioning device 6 further includes a fixing sleeve 66 that is sleeved on an outer side of the optical fiber connector 61, the light homogenizer 62, the cross light transmissive sheet 63, the lens 64, and the half mirror 65 for supporting and fixing the above-mentioned components and connecting with the image acquisition device 5. The fixing sleeve 66 and the image acquisition device 5 are provided with threads for conveniently connecting together. Specifically, the fixing sleeve 66 is substantially a T-shaped structure, wherein the optical fiber connector 61, the light homogenizer 62, the cross light transmissive sheet 63, the lens 64, and the half mirror 65 are located in a transverse arm of the T-shaped structure. One end of a vertical arm of the T-shaped structure is connected to a lower end of the image acquisition device 5, and another end of the vertical arm faces the loading tray 3, so that the light a is incident on the loading tray 3 and the reflected light a can enter the image acquisition device 5.

The level correction method based on the automatic leveling system 1000 includes the following steps:

In a first step, the light source 7 emits light a, and the light a is processed into a cross by the height positioning device 6 and reflected on the reflection devices 4 on the tray 3.

In a second step, all the reflecting devices 4 reflect the light a, and the reflected light a is transmitted through the height positioning device 6 to enter the image acquisition device 5.

In a third step, the image acquisition device 5 obtains the reflected light a, converts the reflected light a into a light signal b, and transmits the light signal b to the controller 8.

In a fourth step, the controller 8 processes the light signal b and calculates the deflection values in the X direction, the Y direction, and the Z direction of the tray 3.

In a fifth step, the controller 8 controls the second driving motor 222 and the first driving motor 212 of the leveling device 2 to adjust the X direction and the Y direction according to the corresponding deflection values, and controls each third driving motor 233 to adjust the respective lifting units 232 to level the tray 3.

Figure 9:
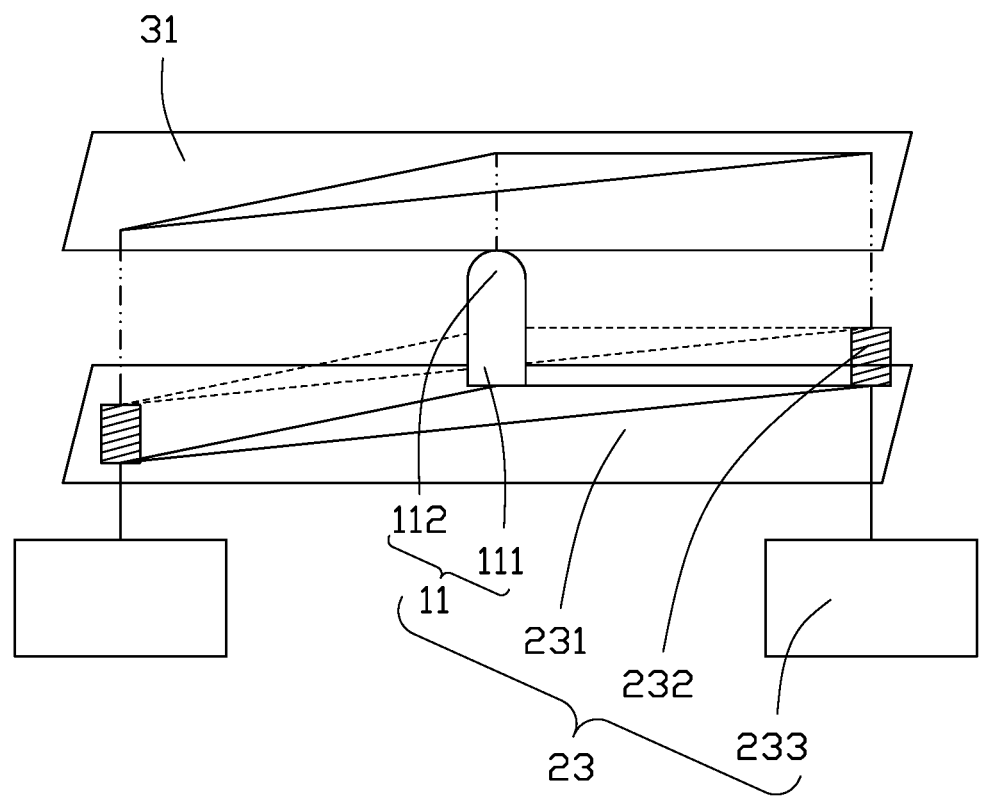
FIG. 9 is a structural diagram of the third adjustment mechanism according to a second embodiment.
Figure 10:
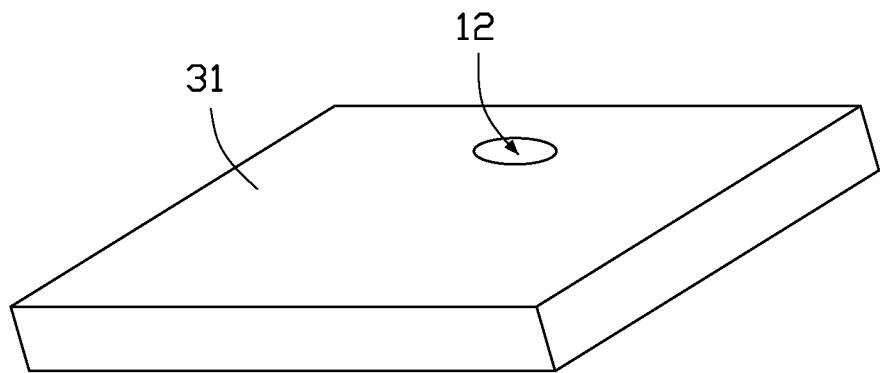
FIG. 10 is a schematic structural diagram of a tray plate of the automatic leveling system.

FIGS. 9 and 10 show a second embodiment of the automatic leveling system 1000. The main difference between the second embodiment and the first embodiment is that a universal adjustment unit 11 includes a cylinder 111 and a hemispherical structure 112 provided on an end of the cylinder 111. An end of the cylinder 111 away from the hemispherical structure 112 is directly fixed on the third carrying platform 231. The tray plate 31 defines a second round groove 12 corresponding to the hemispherical structure 112, and the hemispherical structure 112 is movably received in the second round groove 12. It should be noted that, within the scope of the spirit or basic characteristics of the present disclosure, the specific solutions applicable to the first embodiment can also be correspondingly applied to the second embodiment. By setting the universal adjustment unit 11 as a structure with one end fixed and one end movable, the height adjustment of the loading tray 3 is not limited, and stability of the loading tray 3 is improved.

Compared with the related art, the automatic leveling system 1000 has the following advantages:
1. The aluminum reflectors on the plane of the loading tray cooperate with the optical reflection principle of the height positioning device to obtain reflection information of multiple points on the loading tray at the same time and obtain the deflection values of the loading tray, which is accurate and fast;
2. The height positioning device uses the principle of optical reflection and transmission to pass light into the image acquisition device, reducing the complexity of the overall structure;
3. The height positioning device and the image acquisition device are matched through a thread connection, and the traditional CCD camera can be used to reduce the cost. When adjusting the machine, only the original connected lens of the CCD camera is removed, and the height positioning device can be directly connected for use, which is convenient, reduces the number of CCD cameras used, and reduces the difficulty of setting up the machine;

4. The design of the handles is ergonomically designed and make gripping more comfortable. It also enhances stability during loading and unloading of the loading tray;
5. Five positioning grooves are provided on the loading tray to cooperate with the reflecting devices to more accurately ensure the leveling of the loading tray;
6. After the controller obtains the deflection values of the loading tray, it automatically judges the moving height of the two lifting units, and drives the motors to automatically adjust the deviation with high automation and high speed, which improves the leveling efficiency and accuracy;
7. The third adjustment mechanism adopts the design of a round ball and two screws to form a triangular adjustment mechanism. Only two screws are needed to adjust the level of the loading tray; and
8. The automatic leveling system can be applied to other instruments that need to be leveled, and can also be used with a calculator system to measure the deflection values with strong versatility and wide application range.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An automatic leveling system comprising:
a platform;
a leveling device provided on the platform;
a loading tray provided on the leveling device;
at least three reflecting devices provided on the loading tray;
an image acquisition device provided above the loading tray;
a height positioning device provided on an end of the image acquisition device facing the loading tray;
a light source cooperating with the height positioning device and configured to emit light; and
a controller coupled to the image acquisition device; wherein:
the height positioning device is configured to process the light emitted by the light source into at least three paths of light to the at least three reflecting devices, respectively;
the at least three reflecting devices reflect the at least three paths of light;
the image acquisition device acquires the at least three paths of reflected light into a light signal;
the controller is configured to detect deflection values of the loading tray according to the light signal and control the leveling device to level the loading tray.

2. The automatic leveling system of claim 1, wherein:
the height positioning device comprises an optical fiber connector, a cross light transmissive sheet, and a half mirror arranged in sequence along an emission direction of the light; and
the half mirror is arranged between the image acquisition device and the reflecting devices.

3. The automatic leveling system of claim 2, wherein:
the half mirror is inclined 45° relative to a horizontal plane.

4. The automatic leveling system of claim 3, wherein:
the height positioning device further comprises a light homogenizer, a lens, and a fixing sleeve;
the light homogenizer is arranged between the optical fiber connector and the cross light transmissive sheet;
the lens is arranged between the cross light transmissive sheet and the half mirror; and
the fixing sleeve is sleeved on an outer side of the optical fiber connector, the light homogenizer, the cross light transmissive sheet, the lens, and the half mirror.

5. The automatic leveling system of claim 1, wherein:
the leveling device comprises a first adjustment mechanism provided on the platform, a second adjustment mechanism provided on the first adjustment mechanism, and a third adjustment mechanism provided on the second adjustment mechanism;
the loading tray is provided on the third adjustment mechanism;
the first adjustment mechanism drives the loading tray to move in a first direction, the second adjustment mechanism drives the loading tray to move in a second direction, and the third adjustment mechanism drives the loading tray to move in a third direction; and
the third direction is perpendicular to a plane formed by the first direction and the second direction.

6. The automatic leveling system of claim 5, wherein:
the first adjustment mechanism comprises a first carrying platform provided on the platform and a first driving motor provided on the first carrying platform;
the first driving motor is coupled to the controller; and
the controller is configured to control the first driving motor to drive the first carrying platform to move in the first direction.

7. The automatic leveling system of claim 6, wherein the second adjustment mechanism comprises a second carrying platform arranged on the first carrying platform and a second driving motor arranged on the second carrying platform;
the second driving motor is coupled to the controller; and
the controller is configured to control the second driving motor to drive the second carrying platform to move in the second direction.

8. The automatic leveling system of claim 6, wherein:
the third adjustment mechanism comprises a third carrying platform provided on the second carrying platform, two lifting units provided on the third carrying platform, a third driving motor, and a universal adjustment unit;
the two lifting units and the universal adjustment unit are located on a same plane and form a triangular structure;
the loading tray is arranged on the two lifting units and the universal adjustment unit;
the third driving motor is coupled to the controller; and
the controller controls the third driving motor to drive each lifting unit to move in the third direction separately to adjust the height of the loading tray.

9. The automatic leveling system of claim 8, wherein:
the universal adjustment unit is a round ball;
the third carrying platform and a bottom of the loading tray are provided with a first round groove; and
the universal adjustment unit is movably received in the two opposite first round grooves.

10. The automatic leveling system of claim 8, wherein:

the universal adjustment unit comprises a cylinder and a hemispherical structure provided on an end of the cylinder;

a bottom of the loading tray defines a second round groove;

the hemispherical structure is movably received in the second round groove; and an end of the cylinder away from the hemispherical structure is fixed on the third carrying platform.

11. The automatic leveling system of claim 1, wherein:

the loading tray comprises a tray plate, a tray body provided on the tray plate, a plurality of lens grooves provided on an inner bottom surface of the tray body, and at least three positioning grooves provided on the inner bottom surface of the tray body; and the reflecting devices are set in the at least three positioning grooves.

12. An automatic leveling system comprising:

a platform;

a leveling device provided on the platform;

a loading tray provided on the leveling device;

at least three reflecting devices provided on the loading tray;

an image acquisition device provided above the loading tray;

a height positioning device provided on an end of the image acquisition device facing the loading tray;

a light source cooperating with the height positioning device and configured to emit light; and a controller coupled to the image acquisition device; wherein:

the height positioning device is configured to process the light emitted by the light source into at least three paths of light to the at least three reflecting devices, respectively;

the at least three reflecting devices reflect the at least three paths of light;

the image acquisition device acquires the at least three paths of reflected light into a light signal;

the controller is configured to detect deflection values of the loading tray according to the light signal and control the leveling device to move in a first direction, a second direction, or a third direction to level the loading tray;

the third direction is perpendicular to a plane formed by the first direction and the second direction; and a first position of the loading tray is supported in the third direction;

the controller controls a second position and a third position of the loading tray to move separately in the third direction; and the first position, the second position, and the third position are not on a same line.

\* \* \* \* \*